US005255771A

United States Patent [19]

Nurnberg et al.

[11] Patent Number: 5,255,771

[45] Date of Patent: Oct. 26, 1993

[54] COMBPLATE SAFETY DEVICE

[75] Inventors: Thomas R. Nurnberg, Bettendorf, Iowa; Richard D. Rohret, East Moline, Ill.

[73] Assignee: Montgomery Elevator Company, Moline, Ill.

[21] Appl. No.: 732,162

[22] Filed: Jul. 18, 1991

[51] Int. Cl.[5] .............................................. B65G 43/00

[52] U.S. Cl. .................................... 198/323; 198/325

[58] Field of Search ............... 198/323, 324, 325, 333, 198/334

[56] References Cited

U.S. PATENT DOCUMENTS

| | | | |
|---|---|---|---|
| 2,030,103 | 2/1936 | Dunlop | 198/323 |
| 3,132,733 | 5/1964 | Boman et al. | 198/323 |
| 3,687,257 | 8/1972 | Johnson | 198/325 |
| 4,476,971 | 10/1984 | Schoneweiss | 198/325 X |

FOREIGN PATENT DOCUMENTS

| | | | |
|---|---|---|---|
| 884727 | 11/1971 | Canada . | |
| 2135864 | 1/1973 | Fed. Rep. of Germany . | |
| 2108025 | 5/1972 | France | 198/323 |
| 814838 | 3/1981 | U.S.S.R. . | |
| 1319778 | 6/1973 | United Kingdom . | |

*Primary Examiner*—Joseph E. Valenza
*Assistant Examiner*—Tuan N. Nguyen
*Attorney, Agent, or Firm*—Wood, Phillips, VanSanten, Hoffman & Ertel

[57] ABSTRACT

A combplate safety device for a passenger conveyor moving relative to a frame and having a combplate mounted on the frame and movable relative to the frame in response to an obstruction to the motion of the conveyor. The combplate safety device includes a ramped hold down member which cooperates with the frame to define a rearwardly opening notch within which a complementary portion of the combplate is releasably secured against the frame in a vertically downward direction. A pair of limit switches are actuated upon a predetermined relative displacement of the combplate and the frame for deactivating the conveyor in response to the obstruction to the motion, with a compressible member being posed between the combplate and the frame to prevent accumulated debris from interfering with operation of the safety device.

6 Claims, 2 Drawing Sheets

Fig. 1
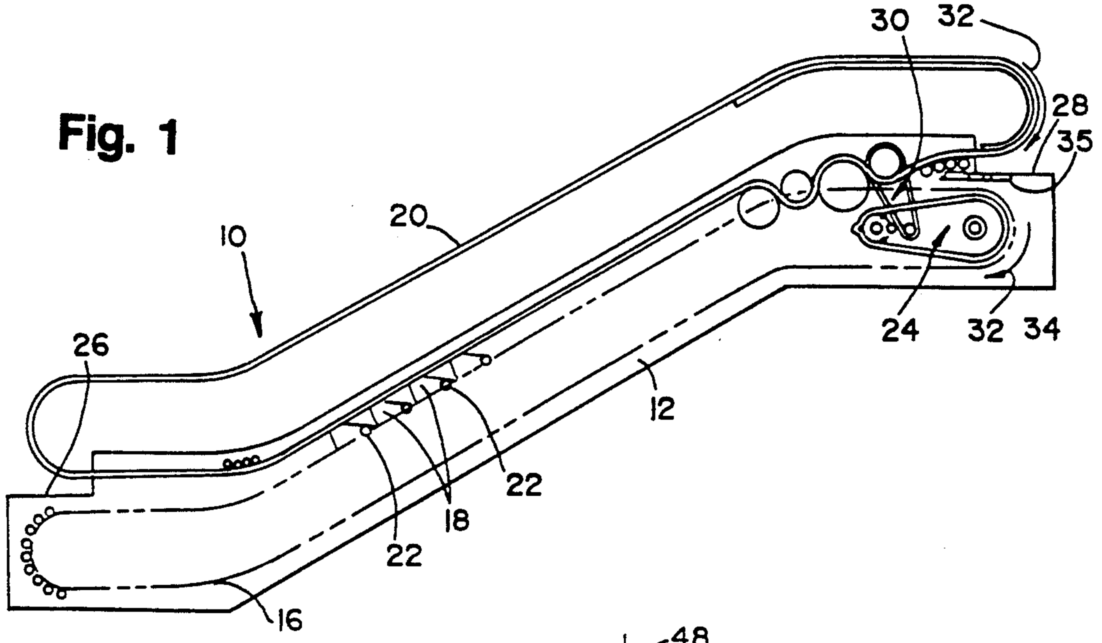
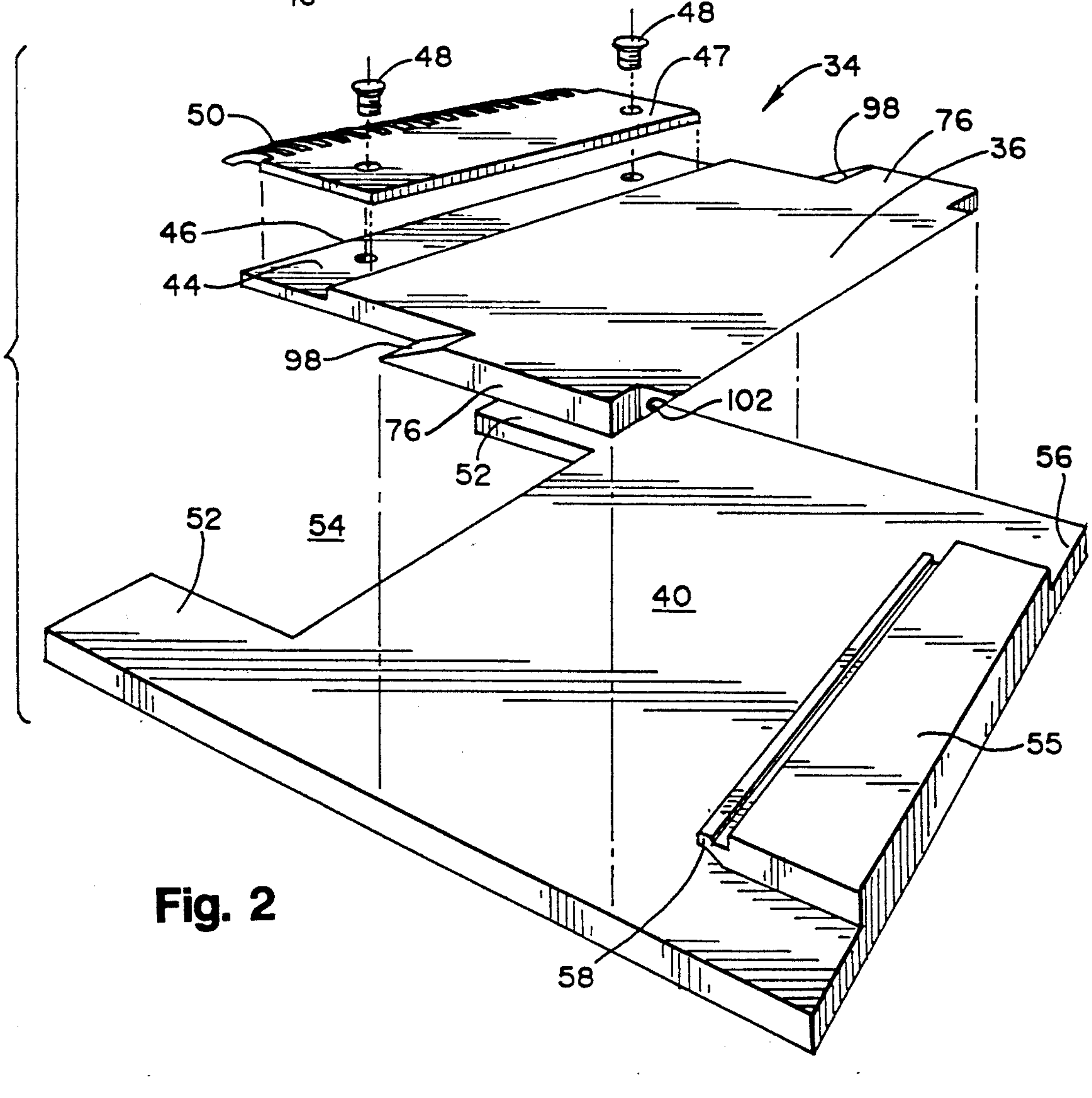
Fig. 2

COMBPLATE SAFETY DEVICE

FIELD OF THE INVENTION

This invention relates to a safety device for a passenger conveyor and, more particularly, to a combplate safety device for automatically stopping a passenger conveyor in response to an obstruction to the motion of the conveyor.

BACKGROUND OF THE INVENTION

A passenger conveyor typically includes a number of passenger platforms or steps which are driven in an endless path between horizontally spaced landings. Commonly, a combplate is mounted at the landings to permit passengers to easily step on or off the conveyor.

During the course of operation of a passenger conveyor, it is possible for a foreign object, such as the pointed heel of a woman's shoe, miscellaneous refuse, or, more dangerously, a body part of a passenger, to become lodged between a step and the combplate. Trapped foreign objects are forced against the combplate by the powerful mechanism which drives the conveyor, and a risk of harm is created for passengers as well as possible damage to the conveyor.

One approach to solving this problem has been to construct a movable combplate. Rather than resist the force generated by the obstruction to the motion of the conveyor, the movable combplate is displaced and closes a circuit which, in turn, deenergizes the conveyor. While the idea of a safety power-cutoff for a passenger conveyor has proved modestly successful, there exist numerous defects int he actual implementation of such a scheme.

Particularly, due to the environment in which many conveyors are utilized, the combplates are subjected to the deposits of a plethora of debris, including, for example, chewing gum, paper wrappers, soda pop, and the like. When the debris accumulates between the movable combplate section and the contact for the power cutoff switch, the movable section becomes jammed and physical contact with the switch is prevented to render the device inoperable.

Another problem which exists with existing movable combplate proposals is the difficulty in maintaining the position of the combplate when the conveyor is activated. Local construction codes commonly mandate certain performance capabilities which a public conveyor must meet. One such requirement is that the combplate maintain a specified degree of engagement with the steps of the conveyor at all times to prevent articles form being pulled below the combplate by the drive mechanism. The lodging of any foreign matter between the steps and the combplate tends to force the combplate upwardly and out of engagement with the steps. Accordingly, an approved safety device must provide for a hold down force to restrict relative displacement of the combplate and the steps. Existing types of clamps and related combplate hold downs tend to restrict the rearward motion of the combplate and thus minimize the effectiveness of the safety device.

SUMMARY OF THE INVENTION

An object, therefore, of the invention, is to provide an new and improved safety device for a combplate of a passenger conveyor which solves the above problems and satisfies the stated needs.

In the exemplary embodiment of the invention, a combplate safety device is used for stopping a passenger conveyor in response to an obstruction to the motion of the conveyor. The conveyor has a combplate mounted on a fixed frame and movable relative to the frame in response to the obstruction. More particularly, the combplate safety device includes hold down means on the frame for releasably securing the movable combplate against the frame in a vertically downward direction and deactivation means operable to stop the passenger conveyor when a predetermined displacement of the combplate occurs.

In order to prevent undesired displacement of the combplate when the conveyor is activated, the combplate hold down means include a pair of ramped hold down blocks fixed to opposite sides of the conveyor. The hold down blocks each have a ramped surface which cooperates with the frame to define a rearwardly opening notch within which a complementary portion of the combplate is releasably secured.

The conveyor is deactivated by means of a pair of reciprocable limit switches provided on the frame and engageable with the combplate. The limit switches are actuated by relative displacement of the combplate and the frame in response to an obstruction to the motion of the conveyor.

To prevent debris from accumulating between the combplate and the frame and thus interfering with operation of the safety device, a forwardly projecting finger is formed on the combplate frame and engages a complementary notch in the combplate. The irregular geometry of the finger and notch, along with a compressible member positioned between the two members, serves to prevent debris from interfering with operation of the deactivation process.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the following description taken in conjunction with the accompanying drawings, in which like reference numerals identify like elements in the figures and in which:

FIG. 1 is schematic side elevational view of a passenger conveyor having the combplate safety device embodying the present invention;

FIG. 2 is an exploded perspective view of the combplate assembly;

DETAILED DESCRIPTION OF THE INVENTION

Figure 3:
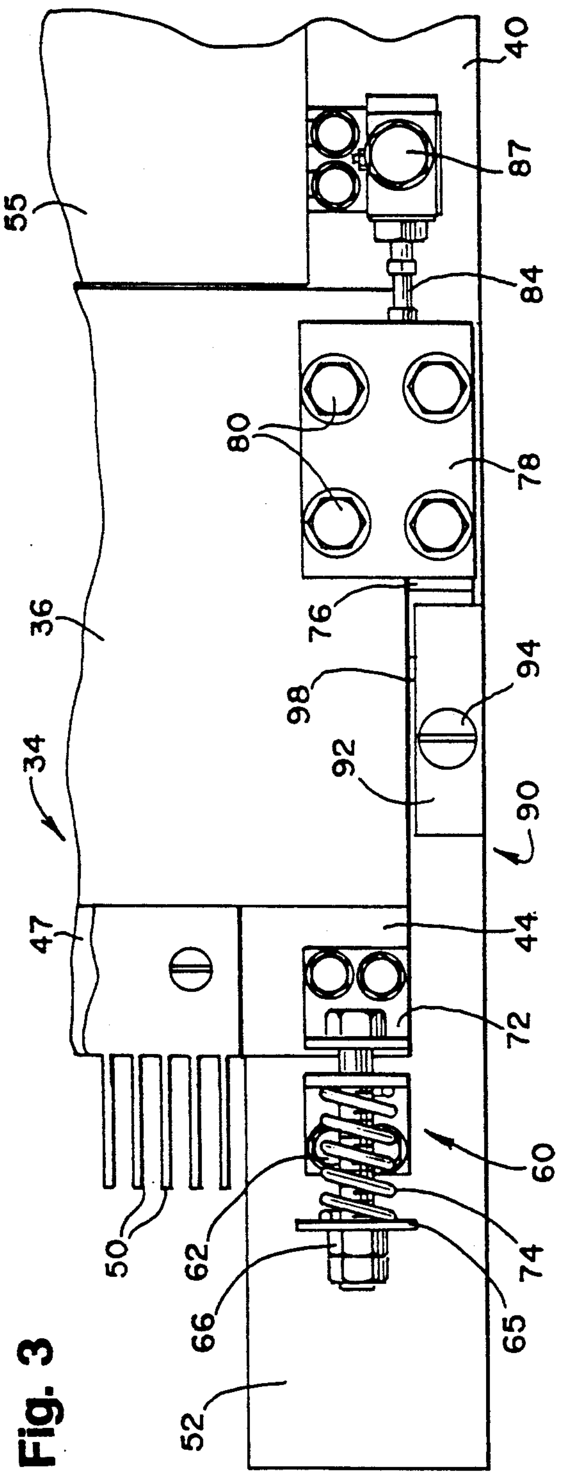
FIG. 3 is a fragmented top plan view, on an enlarged scale, of the combplate safety device.

The present invention is designed for use with a passenger conveyor, such as an escalator, generally designated 10 and shown in FIG. 1, for automatically stopping the escalator in response to an obstruction to the motion of the conveyor, such as when a foreign object becomes lodged in a portion of the conveyor.

As is generally known, a stationary base 12 supports a conveyor assembly which includes a pair of horizontally spaced endless chains 16, a plurality of passenger platforms or steps 18 drivingly engaged with chains 16, and a pair of horizontally spaced circuitous handrails 20. Each platform 18 is fixed to drive chains 16 and has rollers, as at 22, which run in a rail or track (not shown) mounted on stationary base 12. Chains 16 are driven by means of a conventional belt drive mechanism, generally designated 24, to continuously move passenger platforms 18 in a closed-loop path between a lower landing 26 and an upper landing 28. A second belt drive system, generally designated 30, drives handrails 20 for synchronous movement with passenger platforms 18. When handrails 20 and rive chains 16 are moved in directions indicated by arrows 32, a passenger at lower landing 26 steps onto a platform 18 and grasps one of the handrails 20 to be transported toward upper landing 28.

A combplate assembly, generally designated 34, is provided adjacent to the position occupied by each step 18 as the step reaches upper landing 28. A combplate safety device 35 automatically stops the conveyor in response to an obstruction to the motion of the conveyor.

Referring to FIG. 2, combplate assembly 34 has a generally flat base plate 36 overlying a combplate frame 40 and which, as will be described hereinbelow, cooperates with A recessed mounting flange 44 is formed along a forward baseplate edge 46 and rigidly mounts an elongated comb section 47 by means of headed fasteners 48. Comb section 47 includes a plurality of downwardly curved teeth 50 transversely spaced across the comb section and extending beyond combplate edge 46 to enter grooves formed between cleats (not shown) formed on each step of the conveyor as the steps move past the upper landing. The downward curvature of teeth 50 facilitates dismounting from the conveyor by causing the feet of a passenger to be easily transferred from a passenger platform to the upper landing as the conveyor circuitously travels between lower landing 26 and upper landing 28.

Combplate frame 40 is a generally flat rectangular plate rigidly secured to a horizontally extending portion of the stationary base 12. A pair of horizontally spaced arms 52 along a forward edge of the combplate frame define a center opening 54 therebetween. A vertically projecting abutment 55 is formed along a rear edge 56 of the combplate frame and extends forwardly toward center opening 54. A contoured finger 58 is formed integrally with combplate frame 40 and projects upwardly and forwardly from the abutment.

Figure 4:
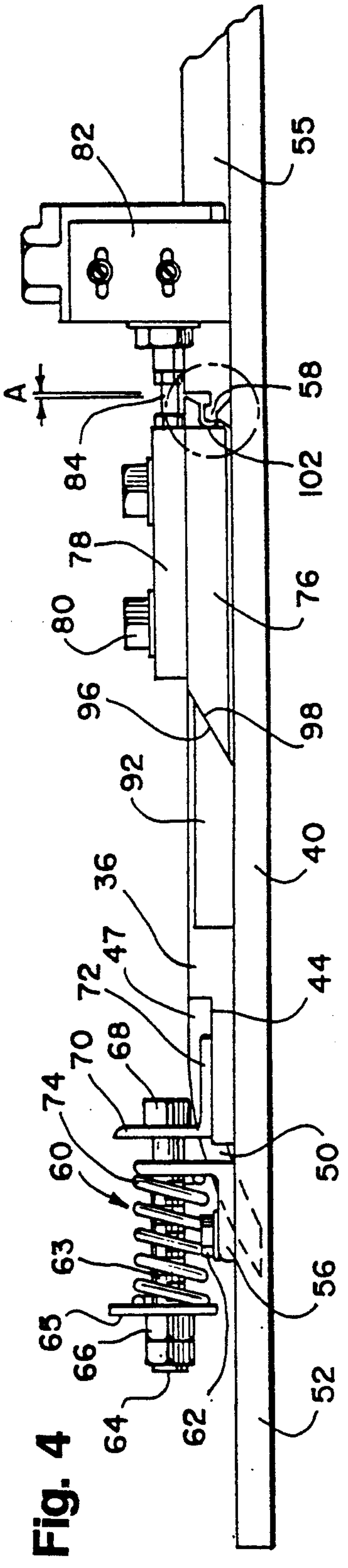
FIG. 4 is a side elevational view of the combplate safety device illustrated in FIG. 3.

Referring to FIGS. 3 and 4 in conjunction with FIG. 2 combplate assembly 34 is resiliently secured to frame 40 in alignment with abutment 55 by means of an override spring assembly, generally designated 60, attached to opposite arms 52 of combplate frame 40 and engaging opposite sides of base plate 36. Each override spring assembly 60 includes an L-shaped flange 61 fixed to an arm 52 of frame 40 by headed fasteners 62 and carry a horizontally extending bolt 63. One end 64 of bolt 63 mounts a pressure plate 65 which, in turn, abuts a retaining nut 66. Horizontal bolt 63 has a headed end 68 which projects through an upstanding leg 70 of a second L-shaped flange 72 fixed to base plate 36. A coil spring 74 is interposed between leg 70 and pressure plate 64 to slidably bias combplate assembly 34 for fore-/aft movement along combplate frame 40, with the stiffness of override spring 74 establishing a force which resists rearward displacement of the combplate.

Combplate safety device 35 can be understood to include a pair of combplate wedges 76 (shown best in FIGS. 2 and 4) are formed integrally with base plate 36 as laterally projecting lugs extending from opposite sides of the combplate. A generally rectangular support block 78 is mounted above each combplate wedge 76, with a plurality of headed fasteners 80 passing through each support block 78 and engaging the underlying combplate wedge.

Deactivation means defined by a pair of electrical switches 82 (one shown in FIGS. 3 and 4) are mounted on opposite sides of combplate frame 40 and adjacent to abutment 55, with each electrical switch having a forwardly extending reciprocable trigger member or plunger 84 engaging a corresponding one of the support blocks 78 on combplate assembly 34. Each electrical switch 82 preferably is a generally well-known pressure switch or limit switch which, when trigger member or plunger 84 is moved sufficiently by a rearward displacement of combplate assembly 34, is operable to deenergize belt drive mechanisms 24 and 30 and instantly stop the conveyor. The length of each trigger member or plunger, and thus the rearward displacement of combplate assembly 34 necessary to deactivate the conveyor, is predetermined by means of an axial-adjustment nut 86 on each electrical switch 82. Rotation of adjustment nuts 86 result in a lengthening or shortening of a respective trigger member or plunger 84 and a corresponding increase or decrease in the sensitivity of the safety device.

During normal operation of the conveyor and with the combplate in a fully retracted position (FIGS. 3 and 4), combplate wedges 76 are biased into a forward position by override springs 74 and forced downwardly against combplate frame 40 by a hold down means 90 which, together with the override springs, generates a force effective to prevent any vertical displacement of the combplate without restricting rearward horizontal displacement of the combplate. With this construction, a purely horizontal biasing force generated by the override spring can be adapted to supply a vertical force component to releasably secure the combplate assembly 34 against the combplate frame in a vertically downward direction and prevent disengagement of the comb section 47 from the conveyor steps 18.

More specifically, hold down means 90 comprises a pair of wedge shaped hold down blocks 92 (one shown in FIGS. 3 and 4) fastened to each side of combplate frame 40 by a headed fastener 94. Each hold down block 92 has a ramped or tapered surface 96 which engages a complementary ramped or tapered surface 98 on combplate wedges 76. Ramped surface 96 on each hold down block 92 cooperates with the upper surface of combplate frame 40 to define a V-shaped notch within which combplate wedges 76 are received. Of course, the present invention envisions that hold down blocks 92 can be formed integrally with combplate frame 40 as well.

During normal operation of the conveyor, that is with belt drives 24 and 30 activated to continuously transport passengers between lower landing 26 and upper landing 28, the horizontal biasing force generated by override springs 74 tend to draw the combplate away from frame abutment 55 and thereby prohibit triggering of the electrical switches 82. Spring 74 forces combplate wedges 76 against complementary hold down blocks 92 to develop a reaction force having a component perpendicular to combplate frame 40 and thereby releasably secure the combplate wedges and prevent uplifting of combplate assembly 34. Hold down blocks 92 can be seen to serve, in addition to a hold down function, a stop function for restraining the forward displacement of the combplate under the biasing influence of spring 74.

Figure 5:
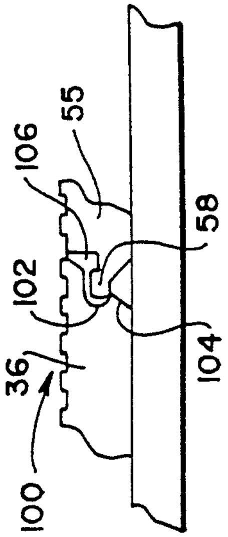
FIG. 5 is an enlarged side view of the electrical contact surfaces in the combplate safety device as illustrated in FIG. 4.

As illustrated in FIGS. 3-5, base plate 36 is normally spaced apart from frame abutment 55 to define a gap "A" therebetween. In a preferred embodiment of the invention, distance "A" is equal to about 0.06 inches. During operation of the conveyor, it is possible for miscellaneous debris to inadvertently accumulate in the gap between the combplate and the frame abutment and interfere with rearward displacement of the combplate. Accordingly, the present invention envisions anti-interference means, generally designated 100 and illustrated in detail in FIG. 5, for preventing debris from interfering with the operation of the combplate safety device.

Particularly, anti-interference means 100 includes a contoured notch 102 formed along a chamfered trailing edge 104 of base plate 36 positioned in alignment with the forwardly projecting finger 58 on abutment 55. As the combplate is displaced rearwardly relative to abutment 55, finger 58 is received within complementary notch 102 in the baseplate. Because edge 104 is chamfered at an angle away from the vertical direction, the chances of debris settling between the combplate and the abutment are reduced. Because edge 104 is chamfered at an angle with respect to the direction of relative movement between the combplate and the abutment, if debris does become lodged in the assembly, chamfered edge 104 on the baseplate tends to ride up over an obstruction and permit actuation of the electrical switches 82.

In addition to the above described means, anti-interference means 100 also include a compressible member 106 positioned in the gap between adjacent combplate assembly 34 and abutment 55 and above finger 58 to prevent debris from obstructing relative movement between the combplate assembly and the abutment. In a preferred embodiment, compressible member 106 comprises a quantity of a pliable, compressible substance, such as silicon gel.

Operation of the present invention may be summarized as follows. With the belt drives 24 and 30 activated to continuously transport passengers between lower landing 26 and upper landing 28, the horizontal biasing force generated by override springs 74 draw combplate wedges 76 against complementary hold down blocks 92 to develop a reaction force having a component perpendicular to combplate frame 40 and thereby releasably secure the combplate wedges and prevent uplifting of the combplate assembly 34.

In the event that a foreign object becomes lodged between passenger platforms or steps 18 and combplate assembly 34, such as the pointed heel of a woman's shoe, belt drive 24 continues to move drive chains 20 and passenger platforms 18, which in turn forces the object against comb section 47. When the obstruction force is sufficient to overcome the stiffness of override springs 74, the combplate is displaced rearwardly and moved into contact with trigger members or plungers 84 on electrical switches 82. Due to the complementary shape of ramped surfaces 96 and 98 on hold down blocks 92 and combplate wedges 76, respectively, the hold down force dissipates the instant that any rearward displacement of the combplate assembly 34 occurs.

Once trigger members 84 are depressed by the rearwardly displaced combplate assembly 34, electrical switches 82 deenergize belt drives 24 and 30 and immediately stop motion of the drive chains 16. Once the belt drives and conveyor are deactivated, combplate assembly 34 is biased out of contact with switches 82 under the influence of override springs 74 and the obstruction then can be removed to allow continued operation of the conveyor.

The present invention can be understood to provide several distinct advantages over existing conveyor shutdown devices. Ramped hold down blocks 92 releasably secure the combplate and, together with the horizontally acting override springs 74, cooperate to generate a hold down force to hold the combplate against combplate frame 40 while the conveyor is safely activated. The instant that the combplate assembly 34 moves axially, that is, substantially parallel with the plane of the combplate, hold down blocks 92 release the combplate segment and do not impede further displacement.

It is also likely that an accumulation of debris between the combplate segments would restrict rearward displacement of the combplate and render the combplate safety device completely inoperable. In the event that debris does accumulate on the device, the chamfer 104 formed along the rear edge of base plate 36 is effective to ride up over the debris and permit unobstructed rearward displacement of the combplate.

To insure proper operation of the subject safety device, the interposition of compressible substance 106 between combplate assembly 34 and frame abutment 55, along with the irregular, interlocking geometry of finger 58 and notch 102, prohibits the inadvertent accumulation of debris on the safety device.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A combplate safety device for stopping a passenger conveyor in response to an obstruction to the motion of the conveyor, the conveyor including a combplate mounted on a frame and movable in response to the obstruction, the combplate safety device comprising:

a block fixed to the frame having a ramped surface, the ramped surface cooperating with the frame to define a rearwardly opening notch within which a complementary member on the combplate is received for releasably securing the combplate against the frame in a vertically downward direction; and deactivation means operable to stop the passenger conveyor when a predetermined displacement of the combplate occurs.

2. A combplate safety device for stopping a passenger conveyor, the conveyor including a combplate mounted on a frame and movable in response to an obstruction of the motion of the conveyor, the combplate safety device comprising:

hold down means on the frame for releasably securing the combplate against the frame in a vertically downward direction;

deactivation means operable to halt the passenger conveyor when a predetermined relative displacement of the combplate and the frame occurs, the deactivation means including a reciprocable trigger which is actuated by relative displacement of the combplate and the frame in response to an obstruction to the motion of the conveyor, and a switch means operable upon actuation of the reciprocable trigger to stop the conveyor; and complementary interlocking surfaces on the combplate and the frame to prevent debris from interfering with operation of the deactivation means.

3. The combplate safety device of claim 2 in which one of the interlocking surfaces has a contoured finger projecting between the combplate and the frame and another of the interlocking surfaces has a complementary notch for receiving the contoured finger.

4. The combplate safety device of claim 2 in which the anti-interference means includes a chamfered edge formed on at least one of the interlocking surfaces, the chamfered edge being angled away from the direction of motion of the combplate.

5. A combplate safety device for stopping a passenger conveyor, the conveyor including a combplate mounted on a frame and movable in response to an obstruction of the motion of the conveyor, the combplate safety device comprising:

hold down means on the frame for releasably securing the combplate against the frame in a vertically downward direction;

deactivation means operable to halt the passenger conveyor when a predetermined relative displacement of the combplate and the frame occurs, the deactivation means including a reciprocable trigger which is actuated by relative displacement of the combplate and the frame in response to an obstruction to the motion of the conveyor, and a switch means operable upon actuation of the reciprocable trigger to stop the conveyor; and anti-interference means to prevent debris from prevent debris from interfering with operation of the deactivation means, the anti-interference means including a compressible member interposed between the frame and the combplate.

6. The combplate safety device of claim 5 in which the compressible member comprises a quantity of silicon gel.

* * * * *